US010721236B1

(12) United States Patent
Kronrod et al.

(10) Patent No.: US 10,721,236 B1
(45) Date of Patent: Jul. 21, 2020

(54) METHOD, APPARATUS AND COMPUTER PROGRAM PRODUCT FOR PROVIDING SECURITY VIA USER CLUSTERING

(71) Applicant: EMC IP Holding Company LLC, Hopkinton, MA (US)

(72) Inventors: Boris Kronrod, Concord, MA (US); Alex Zaslavsky, Petah Tikva (IL); Zohar Duchin, Herzliya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 231 days.

(21) Appl. No.: 15/395,913

(22) Filed: Dec. 30, 2016

(51) Int. Cl.
*H04L 29/06* (2006.01)

(52) U.S. Cl.
CPC .......... *H04L 63/102* (2013.01); *H04L 63/104* (2013.01)

(58) Field of Classification Search
CPC ...... H04L 63/10; H04L 63/102; H04L 63/104
See application file for complete search history.

(56) References Cited

U.S. PATENT DOCUMENTS

| | | | | |
|---|---|---|---|---|
| 6,269,369 B1 * | 7/2001 | Robertson | ............. | G06Q 10/02 |
| 8,966,036 B1 * | 2/2015 | Asgekar | ............... | G06Q 50/01 |
| | | | | 707/706 |
| 9,078,129 B1 * | 7/2015 | Dotan | ................. | H04W 12/06 |
| 9,230,280 B1 * | 1/2016 | Maag | ..................... | G06Q 40/00 |
| 9,516,039 B1 * | 12/2016 | Yen | ......................... | H04L 63/14 |
| 9,699,196 B1 * | 7/2017 | Kolman | ............... | G06F 16/285 |
| 9,712,520 B1 * | 7/2017 | Canavor | ................ | H04L 67/22 |
| 2004/0098589 A1 * | 5/2004 | Appenzeller | ......... | H04L 9/3073 |
| | | | | 713/170 |
| 2012/0246302 A1 * | 9/2012 | Lafleur | .................. | G06Q 30/02 |
| | | | | 709/224 |
| 2013/0124298 A1 * | 5/2013 | Li | ...................... | G06Q 30/0241 |
| | | | | 705/14.42 |
| 2016/0021116 A1 * | 1/2016 | Maguire | .............. | H04L 63/102 |
| | | | | 726/4 |
| 2016/0261621 A1 * | 9/2016 | Srivastava | .......... | H04L 63/1425 |
| 2016/0323318 A1 * | 11/2016 | Terrill | .................... | H04L 63/20 |

* cited by examiner

*Primary Examiner* — Sher A Khan
(74) *Attorney, Agent, or Firm* — Krishnendu Gupta; Nikhil Patel

(57) ABSTRACT

There are disclosed herein a technique for use in security. In at least one embodiment, the technique comprises receiving information relating to users and performing an affinity propagation clustering operation in connection with the information to identify a cluster of similar users. Further, the technique determines a risk in connection with a user in the cluster by comparing the user to one or more other users in the cluster. Still further, based on the risk in connection with the user, the technique controls access by the user to a computerized resource.

12 Claims, 4 Drawing Sheets

METHOD, APPARATUS AND COMPUTER PROGRAM PRODUCT FOR PROVIDING SECURITY VIA USER CLUSTERING

TECHNICAL FIELD

The present invention relates generally to security. More particularly, the present invention relates to a method, an apparatus and a computer program product for providing security via user clustering.

BACKGROUND OF THE INVENTION

Computer networks are often configured to incorporate network security systems in order to protect the networks against malicious activity. Such malicious activity can include, for example, deployment of malware that is utilized by attackers to create networks of compromised computers or "botnets."

Network security systems can be designed to protect a computer network of a large enterprise comprising many thousands of host devices, also referred to herein as simply "hosts." However, enterprise computer networks are in many cases continuously growing in size, and often incorporate a diverse array of host devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on host devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, conventional credential-based authentication techniques and other traditional defences typically deployed by enterprise network security systems today often fail at detecting and remediating access anomalies at a sufficiently early stage.

With this in mind, and in order to address at least some of the above problems, some network security systems are configured to assess risk via grouping or clustering certain persons or users within the enterprise. For example, the network security systems as discussed above may cluster persons within the enterprise that on the face of it at least are associated with one another such that the behavior of one of the persons within the cluster can be compared to the others in the cluster. However, the difficulty with this approach is that it is not a trivial matter for the enterprise to ascertain if one person should be associated with another person. Suppose that two persons belong to the same division or department in the enterprise, it does not necessarily follow that the two persons behave similarly as they may work on different projects or have access to different sets of resources. If these persons were actually clustered then it is likely that any comparison would lead to an inaccurate picture since the persons most likely would behave in a very different manner Here, in this particular instance, the poor clustering leads to the inaccurate picture. This is undesirable.

There is, therefore, a need for further approaches to deal with these problems.

SUMMARY OF THE INVENTION

There is disclosed a method, comprising: receiving, by processing circuitry, information relating to users; performing, by processing circuitry, an affinity propagation clustering operation in connection with the information to identify a cluster of similar users; determining, by processing circuitry, a risk in connection with a user in the cluster by comparing the user to one or more other users in the cluster; and based on the risk in connection with the user, controlling, by processing circuitry, access by the user to a computerized resource.

There is also disclosed an apparatus, comprising: memory; and processing circuitry coupled to the memory, the memory storing program code which, when executed by the processing circuitry, cause the processing circuitry to: receive information relating to users; perform an affinity propagation clustering operation in connection with the information to identify a cluster of similar users; determine a risk in connection with a user in the cluster by comparing the user to one or more other users in the cluster; and based on the risk in connection with the user, control access by the user to a computerized resource.

There is also disclosed a computer program product having a non-transitory computer readable medium which stores a set of instructions, the set of instructions, when carried out by processing circuitry, causing the processing circuitry to perform a method, the method comprising: receiving information relating to users; performing an affinity propagation clustering operation in connection with the information to identify a cluster of similar users; determining a risk in connection with a user in the cluster by comparing the user to one or more other users in the cluster; and based on the risk in connection with the user, controlling access by the user to a computerized resource.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
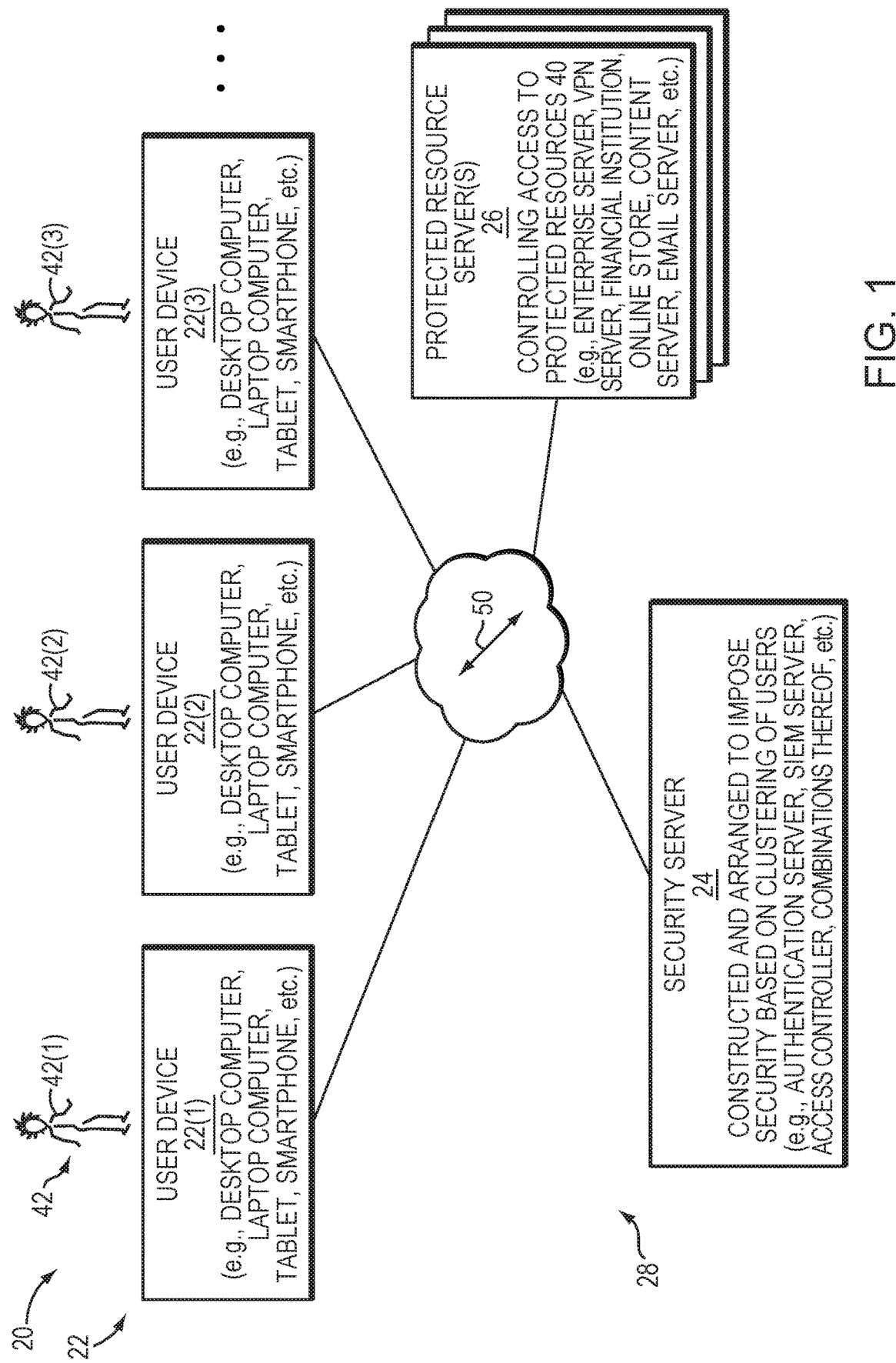
FIG. 1 is a block diagram of an electronic environment which provides security based on clustering of users.

FIG. 1 is a block diagram of an electronic environment 20 which provides security based on clustering of users. The electronic environment 20 includes user devices 22(1), 22(2), 22(3), . . . (collectively, user devices 22), a security server 24, protected resource servers 26, and a communications medium 28.

Each user device 22 is constructed and arranged to perform useful work on behalf of a respective user 42. Along these lines, each user device 22 may be provisioned with, among other things, an email client for sending and receiving email messages, and a calendaring client for scheduling meetings and responding to meeting invitations. Other user-level features may be available as well (e.g., document editing, content accessing, network browsing, transaction completing, etc.). As shown in FIG. 1, a user 42(1) controls and operates user device 22(1), a user 42(2) controls and operates user device 22(2), a user 42(3) controls and operates user device 22(3), and so on. Examples of suitable user devices 22 include workstations, desktop computers, laptops, tablet devices, smart phones, and the like.

The security server 24 is constructed and arranged to impose security based on clustering of the users 42. The security server 24 may be configured to perform authentication, security information and event management (SIEM), access control based on privileges, combinations thereof, and so on. Further details of the operation of the security server 24 will be provided shortly.

The protected resource servers 26 are constructed and arranged to provide access to protected resources 40 based on security instructions/signaling from the security server 24. Such protected resources 40 are capable of being accessed remotely by the user devices 22 following successful authentication with the security server 24 and/or upon granting of particular permissions/privileges to the users 42. Examples of suitable remote protected resources 40 include (among others) accounts and databases of enterprises, VPNs/gateways/other networks, content access, file access, transaction access, and so on.

The communications medium 28 is constructed and arranged to connect the various components of the electronic environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the security server 24 periodically identifies clusters of similar users 42 based on work-related data or information. In particular, the security server 24 is able to query an information source (not shown) that may comprise a directory service such as Active Directory from Microsoft Inc. It should be noted that the directory service may comprise information about users, computers and resources like printers and shared files and folders, as well as e-mail distribution lists, group and role membership data, division, manager, location, etc. Based on the information in the directory service, the security server 24 is able to apply an affinity propagation clustering operation to identify groups or clusters of similar users 42 that form or emerge dynamically and that change over time.

Subsequently, the security server 24 uses such clustering information to facilitate authentication of the respective users 42. That is, in response to receiving a request to access the protected resource 40 from a user device 22 associated with one of the users 42, the cluster of similar users identified above by the security server 24 facilitates risk-based authentication when assessing whether to grant the requesting user 42 access to the protected resource 40. The risk-based authentication in at least one embodiment may be performed by comparing the behavior and/or characteristics of one user to the other users in the cluster. This will be described below in further detail.

Figure 2:
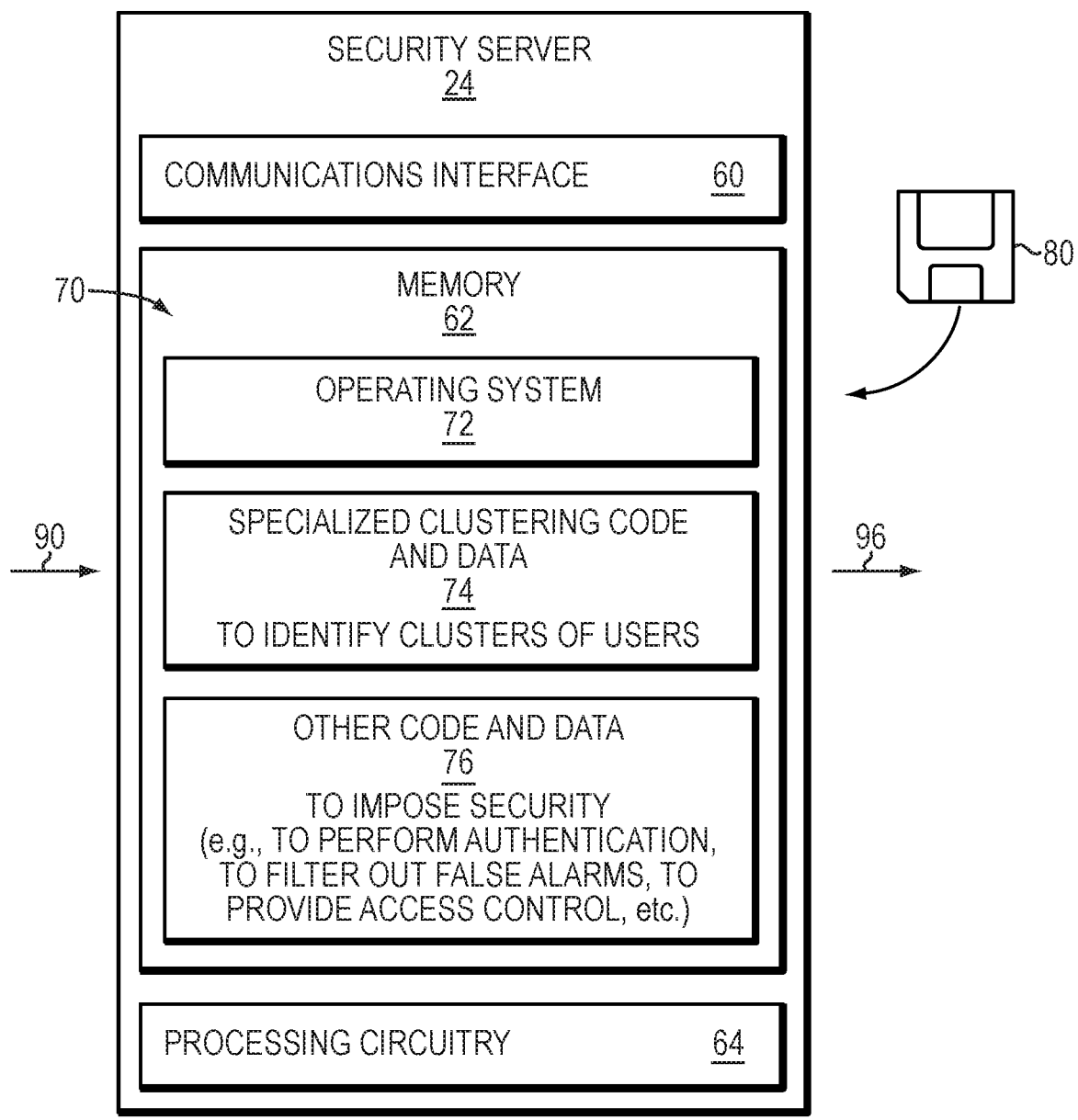
FIG. 2 is a block diagram of a security server of the electronic environment of FIG. 1.

FIG. 2 shows particular details of the security server 24 of the electronic environment 20 (also see FIG. 1). The security server 24 includes a communications interface 60, memory 62, and processing circuitry 64.

The communications interface 60 is constructed and arranged to connect the security server 24 to the communications medium 28 (also see FIG. 1) to enable communications with other devices of the electronic environment 20 (e.g., the user devices 22, the protected resource servers 26, etc.). Such communications may be IP-based, SAN-based, cellular-based, cable-based, fiber-optic based, wireless, combinations thereof, and so on. Accordingly, the communications interface 60 enables the security server 24 to robustly and reliably communicate with other external apparatus of the electronic environment 20.

The memory 62 is intended to represent both volatile storage (e.g., DRAM, SRAM, etc.) and non-volatile storage (e.g., flash memory, magnetic memory, etc.). The memory 62 stores a variety of software constructs 70 including an operating system 72, specialized clustering code and data 74, and other code and data 76. The operating system includes a kernel to manage computerized resources (e.g., processor cycles, memory space, etc.), drivers (e.g., for an I/O stack), tools and utilities (e.g., for administration) and so on. The specialized clustering code and data 74 enables the security server 24 to identify clusters of similar users 42. The other code and data 76 enables the security server 24 to impose various types of security based on the identified clusters of similar users 42 (e.g., perform authentication, filter out false alarms, provide access control, and so on).

The processing circuitry 64 is constructed and arranged to operate in accordance with the various software constructs 70 stored in the memory 62, i.e., to execute code of the various software constructs to perform useful work. Such processing circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the security server 24. In particular, the computer program product 80 has a non-transitory (or non-volatile) computer readable medium which stores a set of instructions which controls one or more operations of the security server 24. Examples of suitable computer readable storage media include tangible articles of manufacture and apparatus which store instructions in a non-volatile manner such as CD-ROM, flash memory, disk memory, tape memory, and the like.

During operation, the security server 24 accesses an information source (not shown) to obtain information 90 in connection with the users. In this instance, the information source comprises a directory service (e.g., Active Directory) that includes the information 90. It should be understood that other types of data are suitable for use as well (e.g., email messages, calendar entries, text messages, chat messages, and the like).

The security server 24 analyzes the data 90 by performing an affinity propagation clustering operation and outputs results including cluster(s) 96 of similar users 42. Here, each cluster 96 identifies users 42 which have certain things in common (e.g., access the same resources, part of the same email distribution list in connection with a project, etc.), and each cluster 96 enables the security server 24 to impose one or more types of security (e.g., authentication, alarm filtering, permissions, etc.). The following example use cases are provided to illustrate certain advantages of the improved techniques.

In some arrangements, the security server 24 operates as an authentication server that performs risk-based or adaptive authentication to authenticate users 42. That is, when a human purporting to be a particular user 42 attempts to authenticate with the security server, the security server 24 collects a current assortment of authentication factors (e.g., time of day, browser settings, resources to be accessed, etc.) and compares that current assortment to an individual behavior profile for that particular user 42. The security server must then signal successful authentication to a protected resource server 26 before the protected resource server 26 is allowed to provide the user 42 access to a protected resource 40. The individual behavior profile is based on previous authentication attempts by that particular user 42 (e.g., previous times of day, previous browser settings, previous resources, etc.).

However, with the clusters 96 of similar users 42 now available, the security server 24 is also able to automatically augment its risk assessment abilities by utilizing the clusters. In one particular embodiment, the security server 24 compares a user 42 to one or more other users in the cluster 96 with a view to determining the similarity between the users. If the security server 24 determines that the users are similar then the risk may be deemed to be low. In other embodiments, the security server 24 is able to automatically generate a profile for each cluster 96 that may reflect user behavioral habits of all of the users 42 in a particular cluster 96 such as, for example, the usual time of day that those users 42 login to their accounts, the particular databases and file systems that those users 42 typically access, the particular programs that those users 42 typically run, the websites that those users 42 typically access, and so on. Again, if the security server 24 determines that the user behaves in a similar manner to the behavior identified by the profile then the risk may be deemed low Now, suppose that a new user 42 joins a particular cluster of similar users 42 (e.g., a new employee joins the finance department). At first, the security server 24 does not have any information about the new user 42. Nevertheless, the security server 24 is able to identify the particular cluster 96 that includes the new user 42, and then compare a current assortment of authentication factors from the new user 42 to the profile associated with that particular cluster 96 to perform risk-based authentication on the new user 42. Here, the risk assigned is still based on how regular or anomalous the user's current behavior is compared to the historical behavior of the other users 42 in the cluster 96 (e.g., do the behavioral habits of the new employee in the finance department match those of the other finance department employees?).

In some arrangements, risk-based authentication may involve comparison of current authentication factors to both a user's individual behavior profile as well as to the cluster. That is, the security server 24 generates a risk score (i.e., a numerical measure of riskiness that a human purporting to be the user 42 is an imposter) based on these comparisons.

The security server 24 deems authentication successful when the risk score is lower than a predefined risk threshold, and deems authentication unsuccessful when the risk score is higher than the predefined risk threshold.

Figure 3:
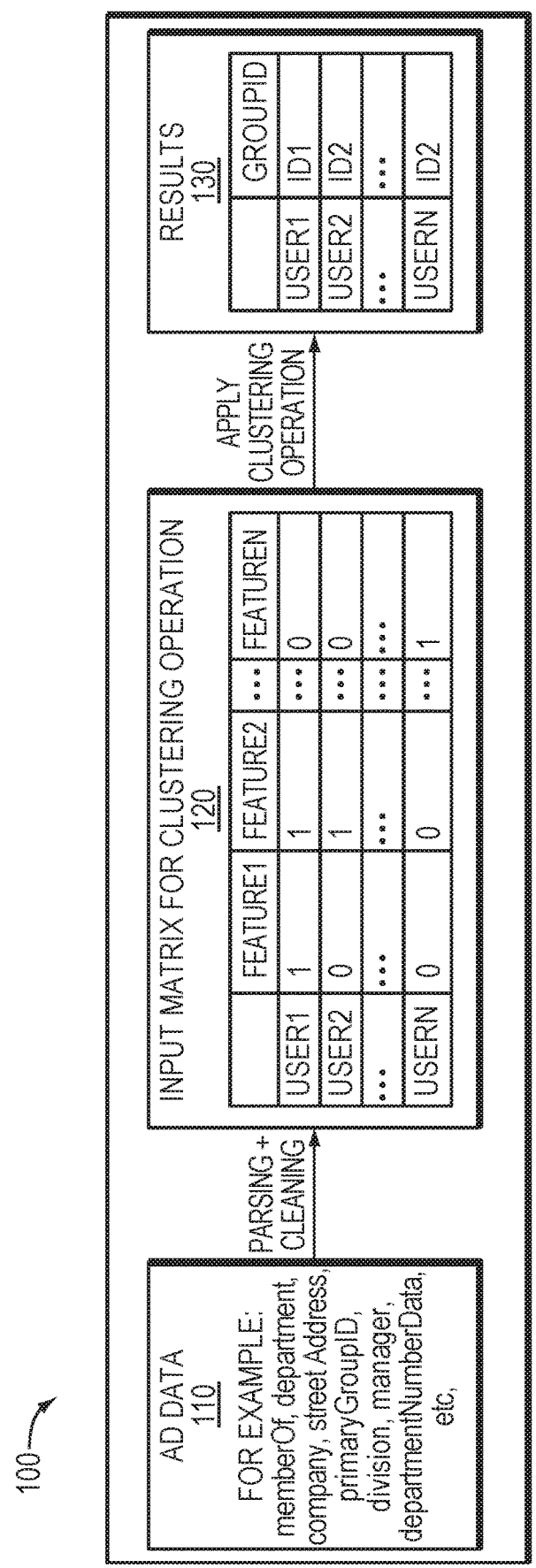
FIG. 3 is a block diagram showing the respective operations involved in the clustering of users by the security server of FIG. 2.

FIG. 3 is a block diagram 100 showing the respective operations involved in the clustering of users by the security server 24. As discussed, the security server 24 is able to query an information source (not shown) that may comprise a directory service such as Active Directory from Microsoft Inc. As will be known by those skilled in the art, the MS Active Directory/Exchange environments includes a very powerful instrument used by many in the enterprise world; i.e., email distribution lists, as well as group and role memberships data, and division/manager/location fields. Once the information is received, the security server 24 performs an affinity propagation clustering operation which can predict with much greater accuracy if users belong to same variety of employees or users (i.e., similar in their normal operations and behavior) in the enterprise. It should be noted that it is possible to run this operation on completely anonymized/tokenized data without exposure of any sensitive information about the enterprise or user names. In such a case, all that is needed is consistent tokens representing users associated with consistent tokens representing distribution lists and group memberships.

As shown, the diagram 100 illustrates the various steps involved in clustering. The first step involves parsing and cleaning data 110 received from an Active Directory or any other directory service. For example, in this particular embodiment, the data in connection with users relates to features such as: memberOf, department, company, streetAddress, primaryGroupID, division, manager, departmentNumberData, etc. Subsequently, and following the cleaning and parsing of the data, an input matrix 120 is created in which each user is assessed with respect to the above respective features in order to determine which of the features are associated with the users. Here, the input matrix 120 facilitates the application of a clustering operation. As a result of the operation, an output comprising results 130 is created that facilitates the creation of clusters of users.

Advantageously, and further to the above, it should be understood that it is also possible to perform an affinity propagation clustering operation or any other suitable clustering algorithm on email distribution lists to identify users tightly connected inside of an enterprise. Also, using resulting clusters information plus any additional knowledge of an organization or enterprise structure can identify groups of people that are expected to use enterprise IT resources in similar manner. Further, this information can be used by a risk engine to determine if a user behaves (uses IT or other resources) in a same way as its detected cluster.

Figure 4:
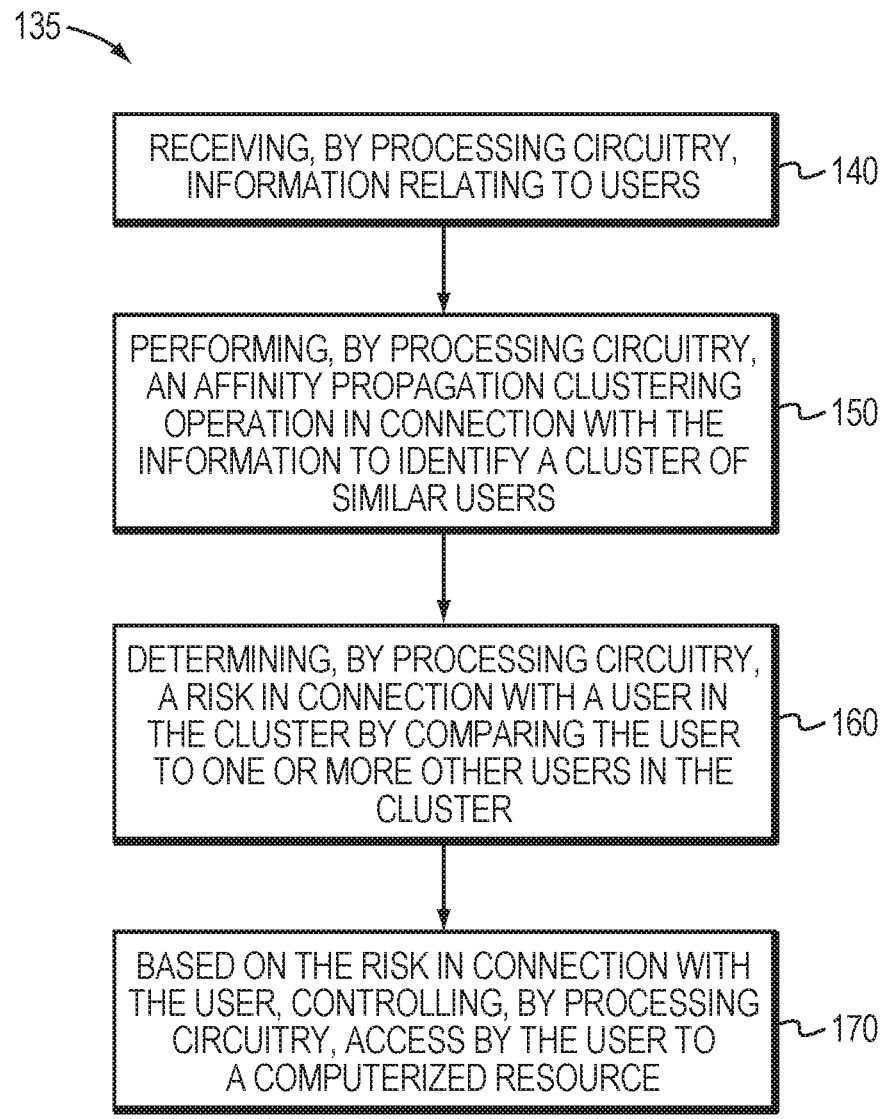
FIG. 4 is a flowchart of a procedure which is performed by the security server of FIG. 2.

FIG. 4 illustrates a flowchart 135 of processing steps that may be performed in an embodiment in accordance with techniques herein. In the flowchart 135, the steps are summarized in individual blocks. The steps may be performed in hardware, or as processor-executable instructions that may be executed by a processor or processing circuitry. Furthermore, the steps may, but need not necessarily, be implemented in the electronic environment 20 of FIG. 1.

At 140, information is received relating to users. At 150, an affinity propagation clustering operation is performed in connection with the information to identify a cluster of similar users. At 160, a risk is determined in connection with a user in the cluster by comparing the user to one or more other users in the cluster. At step 170, access by the user to a computerized resource is controlled based on the risk in connection with the user.

As discussed above, in at least one embodiment, the security server 24 queries an information source which in this instance is a directory service to obtain information 90 in connection with the users. It should be understood that a directory service, such as Active Directory, is used to define, manage and authenticate network entities, such as computing devices, services and real users. Each network entity is treated as an object by the directory service. Each object has a unique name and a set of attributes, and represents a single network entity, such as a user, a computer, a printer, an application, or a shared data source and their respective attributes ("object attributes"). Also, a directory service creates and manages these objects using a hierarchical framework. This framework arranges objects into three broad categories: resources, such as printers; services; and people, such as users and groups. A directory service manages these objects by enabling information to be read from or written to the objects, controlling access to the objects and enforcing security policies defined for the objects.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
    querying an information source including a directory service for information related to users, wherein the directory service configured to create and manage objects related to network entities using a hierarchical framework;
    receiving, by processing circuitry the information relating to the users, wherein the information includes one or more of: user information, computer resources, shared files and folders, communication distribution lists, and group and role membership data; performing, by processing circuitry, an affinity propagation clustering operation in connection with the information to identify a cluster of similar users, wherein the performance of the affinity propagation clustering operation identifies users similar in their normal operations and behavior, further wherein the performance of the affinity propagation clustering operation comprises parsing and cleaning the received data, creating an input matrix from the cleaned and parsed data in which each user is assessed with respect to respective features in order to determine which of the features are associated with the users, and applying the affinity propagation clustering operation to the input matrix in order to create results that are used to identify the similar users, wherein the cluster of similar users is based on one or more of: user behavioral habits, account login times, database and file system accesses, programs run, and website accesses;
    determining, by processing circuitry, a risk in connection with a user in the cluster by comparing the user to one or more other users in the cluster; and
    based on the risk in connection with the user, controlling, by processing circuitry, access by the user to a computerized resource, wherein a risk is deemed low compared to a threshold if the user's behavior is similar to the other users of the cluster or is deemed high compared to the threshold if the user's behavior is not similar to the other users of the cluster.

2. The method as claimed in claim 1, wherein the information is received from a directory service.

3. The method as claimed in claim 1, wherein the information received relates to one or more email distribution lists and the users included on the respective lists.

4. The method as claimed in claim 1, wherein the information received relates to at least one of group, role, division, manager, and location in connection with the respective users.

5. An apparatus, comprising:
    memory; and
    processing circuitry coupled to the memory, the memory storing program code which, when executed by the processing circuitry, cause the processing circuitry to:
        query an information source including a directory service for information related to users, wherein the directory service configured to create and manage objects related to network entities using a hierarchical framework;
        receive the information relating to the users, wherein the information includes one or more of: user information, computer resources, shared files and folders, communication distribution lists, and group and role membership data;
        perform an affinity propagation clustering operation in connection with the information to identify a cluster of similar users, wherein the performance of the affinity propagation clustering operation identifies users similar in their normal operations and behavior, further wherein the performance of the affinity propagation clustering operation comprises parsing and cleaning the received data, creating an input matrix from the cleaned and parsed data in which each user is assessed with respect to respective features in order to determine which of the features are associated with the users, and applying the affinity propagation clustering operation to the input matrix in order to create results that are used to identify the similar users, wherein the cluster of similar users is based on one or more of: user behavioral habits, account login times, database and file system accesses, programs run, and website accesses;
        determine a risk in connection with a user in the cluster by comparing the user to one or more other users in the cluster; and
        based on the risk in connection with the user, control access by the user to a computerized resource, wherein a risk is deemed low compared to a threshold if the user's behavior is similar to behavior of the other users of the cluster or is deemed high compared to the threshold if the user's behavior is not similar to behavior of the other users of the cluster.

6. The apparatus as claimed in claim 5, wherein the information is received from a directory service.

7. The apparatus as claimed in claim 5, wherein the information received relates to one or more email distribution lists and the users included on the respective lists.

8. The apparatus as claimed in claim 5, wherein the information received relates to at least one of group, role, division, manager, and location in connection with the respective users.

9. A computer program product having a non-transitory computer readable medium which stores a set of instructions, the set of instructions, when carried out by processing circuitry, causing the processing circuitry to perform a method, the method comprising:
    querying an information source including a directory service for information related to users, wherein the directory service configured to create and manage objects related to network entities using a hierarchical framework;

receiving the information relating to the users querying an information source including a directory service for information related to users, wherein the directory service configured to create and manage objects related to network entities using a hierarchical framework;

performing an affinity propagation clustering operation in connection with the information to identify a cluster of similar users, wherein the performance of the affinity propagation clustering operation identifies users similar in their normal operations and behavior, further wherein the performance of the affinity propagation clustering operation comprises parsing and cleaning the received data, creating an input matrix from the cleaned and parsed data in which each user is assessed with respect to respective features in order to determine which of the features are associated with the users, and applying the affinity propagation clustering operation to the input matrix in order to create results that are used to identify the similar users, wherein the cluster of similar users is based on one or more of: user behavioral habits, account login times, database and file system accesses, programs run, and website accesses;

determining a risk in connection with a user in the cluster by comparing the user to one or more other users in the cluster; and based on the risk in connection with the user, controlling access by the user to a computerized resource, wherein a risk is deemed low compared to a threshold if the user's behavior is similar to behavior of the other users of the cluster or is deemed high compared to the threshold if the user's behavior is not similar to behavior of the other users of the cluster.

10. The computer program product as claimed in claim 9, wherein the information is received from a directory service.

11. The computer program product as claimed in claim 9, wherein the information received relates to one or more email distribution lists and the users included on the respective lists.

12. The computer program product as claimed in claim 9, wherein the information received relates to at least one of group, role, division, manager, and location in connection with the respective users.

\* \* \* \* \*